(12) United States Patent
Zhou et al.

(10) Patent No.: US 8,913,685 B2
(45) Date of Patent: *Dec. 16, 2014

(54) SELECTING A CODEWORD FOR PRECODING DATA

(75) Inventors: Yongxing Zhou, Beijing (CN); Qiang Wu, Beijing (CN)

(73) Assignee: Huawei Technologies Co., Ltd, Shenzhen (CN)

(*) Notice: Subject to any disclaimer, the term of this patent is extended or adjusted under 35 U.S.C. 154(b) by 285 days.

This patent is subject to a terminal disclaimer.

(21) Appl. No.: 13/332,140

(22) Filed: Dec. 20, 2011

(65) Prior Publication Data

US 2012/0087429 A1 Apr. 12, 2012

Related U.S. Application Data

(63) Continuation of application No. PCT/CN2010/075788, filed on Aug. 9, 2010.

(30) Foreign Application Priority Data

Aug. 7, 2009 (CN) .......................... 2009 1 0091108
Aug. 14, 2009 (CN) .......................... 2009 1 0165292

(51) Int. Cl.
*H04L 27/00* (2006.01)
*H04B 7/04* (2006.01)
*H04B 17/00* (2006.01)

(52) U.S. Cl.
CPC ............ *H04B 17/0057* (2013.01); *H04B 7/043* (2013.01); *H04B 7/0465* (2013.01)
USPC ............................. 375/295; 714/755; 714/781

(58) Field of Classification Search
CPC . H03M 13/2957; H03M 13/29; H03M 13/15; H03M 13/151; H03M 13/09; H03M 13/091
USPC .................. 375/295; 714/755, 767, 781, 759; 341/59, 67
See application file for complete search history.

(56) References Cited

U.S. PATENT DOCUMENTS 7,629,902 B2  12/2009 Zhang et al.
7,929,415 B2   4/2011 Kwak et al.
(Continued)

FOREIGN PATENT DOCUMENTS

CN  101136718 A   3/2008
CN  101166052 A   4/2008
(Continued)

OTHER PUBLICATIONS

Written Opinion of the International Searching Authority received in Patent Cooperation Treaty Application No. PCT/CN2010/075788, mailed Nov. 25, 2010, 6 pages.
(Continued)

*Primary Examiner* — Ted Wang
(74) *Attorney, Agent, or Firm* — Huawei Technologies Co., Ltd

(57) ABSTRACT

A method, a codebook, and a Base Station (BS) for precoding are provided. The precoding method includes: obtaining a total uplink power of a User Equipment (UE); if the total uplink power is greater than ¾ of a rated total transmit power of antennas, selecting a codeword from a first codebook with imbalanced power between layers; otherwise, selecting a codeword from the first codebook and a second codebook with balanced power between layers, so as for precoding data to be transmitted according to the selected codeword.

7 Claims, 3 Drawing Sheets

(56) References Cited

U.S. PATENT DOCUMENTS

| | | | |
|---|---|---|---|
| 2003/0194241 | A1 | 10/2003 | Farmer |
| 2007/0191066 | A1 | 8/2007 | Khojastepour et al. |
| 2008/0095258 | A1 | 4/2008 | She et al. |
| 2008/0186212 | A1 | 8/2008 | Clerckx et al. |
| 2008/0303699 | A1 | 12/2008 | Zhang et al. |
| 2009/0006518 | A1 | 1/2009 | Rensburg et al. |
| 2009/0168904 | A1 | 7/2009 | Roh et al. |
| 2010/0034152 | A1 | 2/2010 | Imamura |
| 2010/0039928 | A1 | 2/2010 | Noh et al. |
| 2010/0183057 | A1 | 7/2010 | Lee et al. |
| 2010/0215110 | A1 | 8/2010 | Onggosanusi et al. |
| 2010/0220801 | A1 | 9/2010 | Lee et al. |
| 2010/0329203 | A1 | 12/2010 | Lee et al. |
| 2011/0013615 | A1 | 1/2011 | Lee et al. |
| 2011/0090985 | A1 | 4/2011 | Zhou et al. |

FOREIGN PATENT DOCUMENTS

| | | |
|---|---|---|
| CN | 101335558 A | 12/2008 |
| CN | 101425830 A | 5/2009 |
| CN | 101478335 A | 7/2009 |
| CN | 101675599 A | 3/2010 |
| CN | 102422582 A | 4/2012 |
| WO | WO 2006/007148 A1 | 1/2006 |
| WO | WO 2009/031846 A1 | 3/2009 |
| WO | WO 2009/045910 A2 | 4/2009 |
| WO | WO 2009/066936 A1 | 5/2009 |

OTHER PUBLICATIONS

Chinese Office Action and partial translation received in Chinese Patent Application No. 200910165292.3, mailed Jun. 19, 2012, 5 pages.

Chinese Search Report and partial translation received in Chinese Patent Application No. 200910165292.3, mailed Aug. 7, 2009, 6 pages.

European Search Report received in European Patent Application No. 10806060.9, mailed Jun. 25, 2012, 17 pages.

Huawei, "UL MA for LTE-Advanced," 3GPP TSG RAN WG1 Meeting #55, R1-084347, Prague, Czech Republic, Nov. 10-14, 2008, 5 pages.

Nokia Siemens Networks, et al., "Precoding for 4 Tx UE in LTE-Advanced UL," 3GPP TSG RAN WG1 Meeting #57, R1-091774, San Francisco, CA, USA, May 4-8, 2009, 6 pages.

Nokia Siemens Networks, et al., "Precoding for 4 Tx UE in LTE-Advanced UL," 3GPP TSG RAN WG1, Meeting #57bis, R1-092576, Los Angeles, CA, USA, Jun. 29-Jul. 3, 2009, 10 pages.

Samsung, "Way Forward to MU-MIMO Design," 3GPP TSG RAN WG1 Meeting #49bis, R1-073100, 3GPP TSG RAN WG1 Meeting #49bis, R1-073100, Orlando, FL, USA, Jun. 25-29, 2007, 4 pages.

Texas Instruments, "4Tx Codebook for UL SU-MIMO: Rank-3," 3GPP TSG RAN WG1 57bis, R1-092949, Los Angeles, CA, USA, Jun. 29-Jul. 3, 2009, 7 pages.

$3^{rd}$ Generation Partnership Project, Technical Specification Group Radio Access Network; Evolved Universal Terrestrial Radio Access (E-UTRA); Physical Channels and Modulation (Release 8), 3GPP TS 36.211, v8.7.0, May 2009, 83 pages.

ZTE, "Considerations on Precoding for UL 4 Tx SU-MIMO in LTE-A," 3GPP TSG-RAN WG1 #57bis, R1-092865, Los Angeles, CA, USA, Jun. 29-Jul. 3, 2009, 6 pages.

3GPP TS 36.211 V8.2.0 (Mar. 2008), $3^{rd}$ Generation Partnership Project; Technical Specification Group Radio Access Network; Evolved Universal Terrestrial Radio Access (E-UTRA); Physical Channels and Modulation (Release 8), Mar. 2008, 65 pages.

Onggosanusi, E. N., et al., "4Tx Codebook for Uplink SU-MIMO: Cubic Metric (MC) [sic] Preserving Design," U.S. Appl. No. 61/219,230, filed Jun. 22, 2009, 22 pages.

Onggosanusi, E. N., et al., "4Tx Codebook for Uplink SU-MIMO: Cubic Metric (CM) Preserving Design," U.S. Appl. No. 61/301,909, filed Feb. 5, 2010, 25 pages.

Onggosanusi, E. N., et al., "Progressing on 4Tx Codebook Design for Uplink SU-MIMO," U.S. Appl. No. 61/172,529, filed Apr. 24, 2009, 12 pages.

Onggosanusi, E. N., et al., "Precoding Codebook Design with Low Power Rating," U.S. Appl. No. 61/154,676, filed Feb. 23, 2009, 31 pages.

Onggosanusi, E. N., et al., "4Tx Codebook for Uplink SU-MIMO: Cubic Metric (CM) Preserving Design," U.S. Appl. No. 61/242,274, filed Sep. 14, 2009, 23 pages.

Onggosanusi, E. N., et al., "4Tx Codebook for Uplink SU-MIMO: Cubic Metric (CM) Preserving Design," U.S. Appl. No. 61/219,212, filed Jun. 22, 2009, 22 pages.

Lee, D. W., et al., "Codebook Design for DFT-s-OFDM Based MIMO," U.S. Appl. No. 61/220,593, filed Jun. 26, 2009, 29 pages.

Onggosanusi, E. N., et al., "4Tx Codebook for Uplink SU-MIMO: Cubic Metric (CM) Preserving Design," U.S. Appl. No. 61/181,474, filed May 27, 2009, 22 pages.

International Search Report, PCT/CN2010/075788, dated Nov. 25, 2010, 9 pages.

SELECTING A CODEWORD FOR PRECODING DATA

This application is a continuation of International Application No. PCT/CN2010/075788, filed on Aug. 9, 2010, which claims priority to Chinese Patent Application No. 200910091108.5, filed on Aug. 7, 2009 and Chinese Patent Application No. 200910165292.3, filed on Aug. 14, 2009, both of which are hereby incorporated by reference in their entireties.

This application is related to U.S. patent application Ser. No. 12/983,103, filed Dec. 31, 2010, now U.S. Pat. No. 8,014,453, and U.S. patent application Ser. No. 13/016,572, filed Jan. 28, 2011, now abandoned, both of which are hereby incorporated by reference in their entireties.

TECHNICAL FIELD

The present invention relates to the field of communication technology, and in particular, to a method, a codebook, and a Base Station (BS) for precoding.

BACKGROUND

The Long Term Evolution-Advanced (LTE-A) is a subsequent evolution of the LTE technology. In the LTE-A, the Single Carrier Frequency Division Multiple Access (SC-FDMA) in the LTE continues to be adopted as a coding mode for the uplink data. The LTE-A can at most support four antennas to transmit data at the same time, so precoding of the uplink data by adopting a codebook becomes possible.

In the process of implementing the present invention, the inventors find that the prior art at least has the following problems. In a case of a high signal-to-noise ratio, if data to be transmitted is being precoded by adopting an existing codebook structure, a loss occurs to a transmit performance of the transmit antenna, and if a transmit power of the transmit antenna is restricted, the power amplification of the transmit antenna cannot be completely used for full power transfer.

SUMMARY OF THE INVENTION

The embodiments of the present invention provide a method, a codebook, and a BS for precoding, so as to solve the problems of the loss of the transmit performance of the transmit antenna and the incapability of full power transmission if the transmit power is restricted.

An embodiment of the present invention provides a method for precoding, where the method includes obtaining a total uplink power of a User Equipment (UE); and if the total uplink power is smaller than or equal to ¾ of a rated total transmit power of antennas, selecting a codeword from a first codebook with imbalanced power between layers and a second codebook with balanced power between layers, so the UE precodes data to be transmitted according to the selected codeword.

Correspondingly, an embodiment of the present invention provides a BS, where the BS includes an obtaining module, configured to obtain a total uplink power of a UE; and a first processing module, configured to select a codeword from a first codebook with imbalanced power between layers and a second codebook with balanced power between layers if the total uplink power obtained by the obtaining module is smaller than equal to ¾ of a rated total transmit power of antennas, so the UE precodes data to be transmitted according to the selected codeword.

In the embodiments of the precoding method and the corresponding BS according to the present invention, the BS can select a codeword from a corresponding codebook for precoding data to be transmitted according to a relationship between the total uplink power reported by the UE and the maximal rated total power of the antenna of the BS, so the UE precodes data to be transmitted according to the selected codeword. As in the method in this embodiment, the codebook structure adopts a first codebook with imbalanced power between layers and a second codebook with balanced structures between layers, if the codeword is being selected from the second codebook for precoding, loss of an antenna performance at a high signal-to-noise ratio is reduced, and if the codeword is selected from the first codebook for precoding, loss of the power amplification of the antenna can be reduced if the transmit power of the antenna is restricted.

In view of the problem in prior art that cubic metric (CM) characteristics are unable to be preserved, an embodiment of the present invention further provides another precoding method, where the method includes allocating a sub-carrier resource to a UE; and if the sub-carrier resource is continuously allocated, selecting a cubic metric preserving (CMP) codebook for precoding data to be transmitted; otherwise, selecting a cubic metric friendly (CMF) codebook for precoding data to be transmitted.

Correspondingly, an embodiment of the present invention further provides a BS, where the BS includes an allocation module, configured to allocate a sub-carrier resource to the UE; and a second processing module, configured to select a CMP codebook for precoding data to be transmitted if the sub-carrier resource is continuously allocated; otherwise, select a CMF codebook for precoding data to be transmitted.

In the embodiments of the precoding method and the corresponding BS according to the present invention, the BS can select a codeword from different codebooks respectively for precoding data to be transmitted according to different types of the sub-carrier resource allocated by the UE, such that the CM characteristics are guaranteed by selecting the codeword in the CMP codebook if the sub-carrier resource is continuously allocated.

As a code distance of the codebook structure in the prior art is too small and complexity is relatively high, an embodiment of the present invention provides a codebook, where the codebook includes at least one codeword of $$\frac{1}{2}\begin{bmatrix}0&1&0\\1&0&0\\0&0&1\\1&0&0\end{bmatrix}, \frac{1}{2}\begin{bmatrix}0&1&0\\1&0&0\\0&0&1\\-1&0&0\end{bmatrix}, \frac{1}{2}\begin{bmatrix}1&0&0\\0&1&0\\1&0&0\\0&0&1\end{bmatrix}, \frac{1}{2}\begin{bmatrix}1&0&0\\0&1&0\\-1&0&0\\0&0&1\end{bmatrix},$$

$$\frac{1}{2}\begin{bmatrix}1&0&0\\1&0&0\\0&1&0\\0&0&1\end{bmatrix}, \frac{1}{2}\begin{bmatrix}1&0&0\\-1&0&0\\0&1&0\\0&0&1\end{bmatrix}, \frac{1}{2}\begin{bmatrix}0&1&0\\0&0&1\\1&0&0\\1&0&0\end{bmatrix}, \frac{1}{2}\begin{bmatrix}0&1&0\\0&0&1\\1&0&0\\-1&0&0\end{bmatrix},$$

$$\frac{1}{2}\begin{bmatrix}1&0&0\\0&0&1\\0&1&0\\1&0&0\end{bmatrix}, \frac{1}{2}\begin{bmatrix}1&0&0\\0&0&1\\0&1&0\\-1&0&0\end{bmatrix}, \frac{1}{2}\begin{bmatrix}0&1&0\\1&0&0\\1&0&0\\0&0&1\end{bmatrix}, \text{and } \frac{1}{2}\begin{bmatrix}0&1&0\\1&0&0\\-1&0&0\\0&0&1\end{bmatrix}.$$

As fewer codewords are used in the codebook, an average code distance is increased, and the Quadrature Phase Shift Keying (QPSK) character set is not used in the codebook, so the complexity is relatively reduced.

In view of that in the prior art the CM characteristics are unable to be preserved in the codebook structure, an embodiment of the present invention further provides another codebook, where the codebook includes at least one codeword of $$\frac{1}{\sqrt{5}}\begin{bmatrix} 0.5 & 1 & 0 \\ -0.5 & 1 & 0 \\ 0.5 & 0 & 1 \\ 0.5j & 0 & -j \end{bmatrix}, \frac{1}{\sqrt{5}}\begin{bmatrix} 0.5 & 1 & 0 \\ 0.5j & 0 & 1 \\ -0.5j & j & 0 \\ -0.5j & 0 & 1 \end{bmatrix}, \frac{1}{\sqrt{5}}\begin{bmatrix} 0.5 & 1 & 0 \\ -0.5 & 1 & 0 \\ 0.5j & 0 & 1 \\ 0.5 & 0 & j \end{bmatrix},$$

$$\frac{1}{\sqrt{5}}\begin{bmatrix} 0.5 & 1 & 0 \\ 0.5j & 0 & 1 \\ 0.5 & 0 & j \\ -0.5 & 1 & 0 \end{bmatrix}, \frac{1}{\sqrt{5}}\begin{bmatrix} 0.5 & 1 & 0 \\ -0.5j & 0 & 1 \\ -0.5 & 1 & 0 \\ -0.5 & 0 & j \end{bmatrix}, \frac{1}{\sqrt{5}}\begin{bmatrix} 0.5 & 1 & 0 \\ 0.5j & -j & 0 \\ -0.5 & 0 & 1 \\ 0.5 & 0 & 1 \end{bmatrix},$$

$$\frac{1}{\sqrt{5}}\begin{bmatrix} 0.5 & 1 & 0 \\ 0.5j & -j & 0 \\ 0.5j & 0 & 1 \\ 0.5j & 0 & -1 \end{bmatrix}, \frac{1}{\sqrt{5}}\begin{bmatrix} 0.5 & 1 & 0 \\ -0.5 & 0 & 1 \\ -0.5j & 0 & -j \\ -0.5 & 1 & 0 \end{bmatrix},$$

$$\frac{1}{\sqrt{5}}\begin{bmatrix} 0.5 & 1 & 0 \\ 0.5 & -1 & 0 \\ 0.5j & 0 & 1 \\ -0.5 & 0 & -j \end{bmatrix}, \frac{1}{\sqrt{5}}\begin{bmatrix} 0.5 & 1 & 0 \\ -0.5 & 0 & 1 \\ -0.5 & 0 & -1 \\ -0.5j & j & 0 \end{bmatrix}, \frac{1}{\sqrt{5}}\begin{bmatrix} 0.5 & 1 & 0 \\ 0.5 & 0 & 1 \\ 0.5j & -j & 0 \\ -0.5 & 0 & 1 \end{bmatrix},$$

$$\frac{1}{\sqrt{5}}\begin{bmatrix} 0.5 & 1 & 0 \\ -0.5j & 0 & 1 \\ -0.5j & 0 & -1 \\ 0.5j & -j & 0 \end{bmatrix}, \frac{1}{\sqrt{5}}\begin{bmatrix} 0.5 & 1 & 0 \\ 0.5 & 0 & 1 \\ 0.5 & -1 & 0 \\ -0.5j & 0 & j \end{bmatrix}, \frac{1}{\sqrt{5}}\begin{bmatrix} 0.5 & 1 & 0 \\ -0.5j & j & 0 \\ -0.5j & 0 & 1 \\ 0.5j & 0 & 1 \end{bmatrix},$$

$$\frac{1}{\sqrt{5}}\begin{bmatrix} 0.5 & 1 & 0 \\ -0.5 & 0 & 1 \\ 0.5 & 0 & 1 \\ 0.5j & -j & 0 \end{bmatrix}, \text{ and } \frac{1}{\sqrt{5}}\begin{bmatrix} 0.5 & 1 & 0 \\ -0.5j & j & 0 \\ -0.5 & 0 & 1 \\ -0.5 & 0 & -1 \end{bmatrix}.$$

In the codebook, by introducing imbalanced power between layers, a power of a column with all elements being non-zero is further reduced, so the CM value is reduced and the CM characteristics are improved.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF ILLUSTRATIVE EMBODIMENTS

The technical solution of the embodiments of the present invention will be clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

Figure 1:
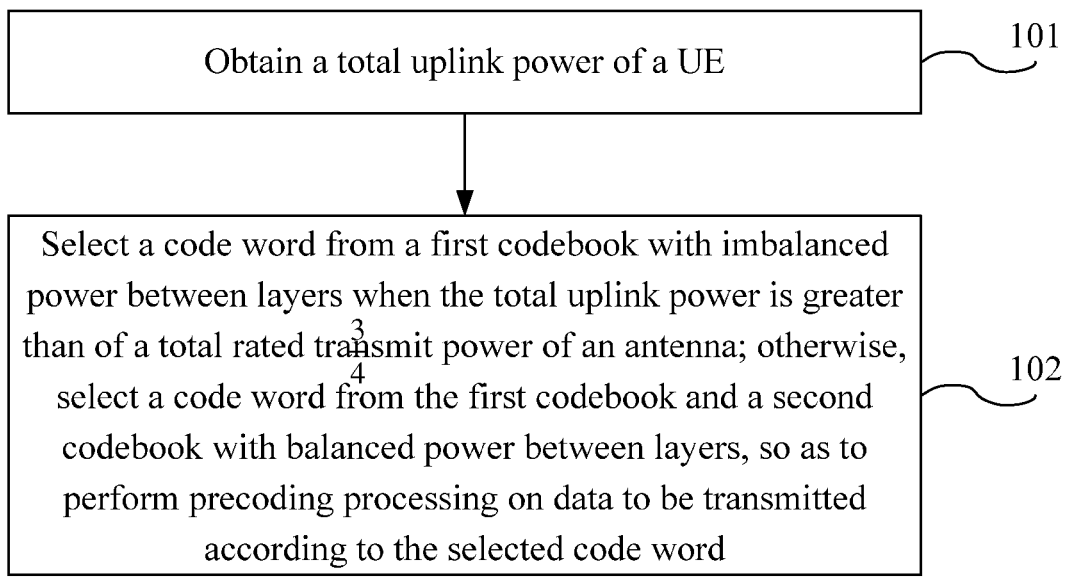
FIG. 1 is a flow chart of an embodiment of a precoding method according to the present invention.

FIG. 1 is a flow chart of an embodiment of a precoding method according to the present invention. As shown in FIG. 1, the precoding method in this embodiment includes the following steps.

In Step 101, a total uplink power of a UE is obtained.

For example, a BS, for example, an eNodeB, can obtain the total uplink power of the UE, in which the total uplink power can be a total power after the uplink power control. The eNodeB can determine a transmit power that the antenna needs to transmit data to the UE according to the total uplink power of the UE, that is, select which codebook structure for precoding data to be transmitted.

In Step 102, if the total uplink power is greater than ¾ of a rated total transmit power of antennas, a codeword is selected from a first codebook with imbalanced power between layers; otherwise, a codeword is selected from the first codebook and a second codebook with balanced power between layers, so the UE precodes data to be transmitted according to the selected codeword.

In the prior art, a codebook used for 3-layer transfer (rank=3) of four transmit antennas mainly includes the following three types.

A first codebook structure is as shown in expression (1).

$$\frac{1}{2}\begin{bmatrix} 0 & 1 & 0 \\ 1 & 0 & 0 \\ 0 & 0 & 1 \\ x & 0 & 0 \end{bmatrix}, \frac{1}{2}\begin{bmatrix} 1 & 0 & 0 \\ 0 & 1 & 0 \\ x & 0 & 0 \\ 0 & 0 & 1 \end{bmatrix}, \frac{1}{2}\begin{bmatrix} 1 & 0 & 0 \\ x & 0 & 0 \\ 0 & 1 & 0 \\ 0 & 0 & 1 \end{bmatrix}, \frac{1}{2}\begin{bmatrix} 0 & 1 & 0 \\ 0 & 0 & 1 \\ 1 & 0 & 0 \\ x & 0 & 0 \end{bmatrix} \quad (1)$$

$x \in \{+1, -1, +j, -j\}$. The 3 columns of the codebook stand for 3-layer transfer, and 4 rows stand for 4 transmit antennas.

As X has 4 values, 16 codewords in total exist in the codebook, and in the expression (1) 8 codewords are a Quadrature Phase Shift Keying (QPSK) character set, that is, codewords with x=+j or −j. The rest 8 codewords are a Binary Phase Shift Keying (BPSK) character set, that is, codewords with x=+1 or −1.

For a codebook structure as shown in expression (1), the transfer power of four transmit antennas corresponding to the first column is larger than the transfer power in the other two layers, and the transfer power in each layer is imbalanced. In a case of a high signal-to-noise ratio, loss occurs to the transmit performance of the transmit antenna of the codebook structure. Meanwhile, as in the codebook in expression (1), the QPSK character set occupies half of the character set, the calculation complexity during the precoding is also large.

The second codebook structure is as shown in expression (2).

$$\frac{1}{\sqrt{3}}\begin{bmatrix} 1/\sqrt{2} & 0 & 0 \\ 0 & 1 & 0 \\ 1/\sqrt{2} & 0 & 0 \\ 0 & 0 & 1 \end{bmatrix}, \frac{1}{\sqrt{3}}\begin{bmatrix} 0 & 1 & 0 \\ 1/\sqrt{2} & 0 & 0 \\ 0 & 0 & 1 \\ 1/\sqrt{2} & 0 & 0 \end{bmatrix}, \frac{1}{\sqrt{3}}\begin{bmatrix} 1/\sqrt{2} & 0 & 0 \\ 1/\sqrt{2} & 0 & 0 \\ 0 & 1 & 0 \\ 0 & 0 & 1 \end{bmatrix},$$

$$\frac{1}{\sqrt{3}}\begin{bmatrix} 0 & 1 & 0 \\ 0 & 0 & 1 \\ 1/\sqrt{2} & 0 & 0 \\ 1/\sqrt{2} & 0 & 0 \end{bmatrix}, \frac{1}{\sqrt{3}}\begin{bmatrix} 1/\sqrt{2} & 0 & 0 \\ 0 & 1 & 0 \\ -1/\sqrt{2} & 0 & 0 \\ 0 & 0 & 1 \end{bmatrix}, \frac{1}{\sqrt{3}}\begin{bmatrix} 0 & 1 & 0 \\ 1/\sqrt{2} & 0 & 0 \\ 0 & 0 & 1 \\ -1/\sqrt{2} & 0 & 0 \end{bmatrix},$$

$$\frac{1}{\sqrt{3}}\begin{bmatrix} 1/\sqrt{2} & 0 & 0 \\ -1/\sqrt{2} & 0 & 0 \\ 0 & 1 & 0 \\ 0 & 0 & 1 \end{bmatrix}, \frac{1}{\sqrt{3}}\begin{bmatrix} 0 & 1 & 0 \\ 0 & 0 & 1 \\ 1/\sqrt{2} & 0 & 0 \\ -1/\sqrt{2} & 0 & 0 \end{bmatrix},$$

$$\frac{1}{\sqrt{3}}\begin{bmatrix} 1/\sqrt{2} & 0 & 0 \\ 0 & 1 & 0 \\ 1/\sqrt{2}j & 0 & 0 \\ 0 & 0 & 1 \end{bmatrix}, \frac{1}{\sqrt{3}}\begin{bmatrix} 0 & 1 & 0 \\ 1/\sqrt{2} & 0 & 0 \\ 0 & 0 & 1 \\ 1/\sqrt{2}j & 0 & 0 \end{bmatrix},$$

$$\frac{1}{\sqrt{3}}\begin{bmatrix} 1/\sqrt{2} & 0 & 0 \\ 1/\sqrt{2}j & 0 & 0 \\ 0 & 1 & 0 \\ 0 & 0 & 1 \end{bmatrix}, \frac{1}{\sqrt{3}}\begin{bmatrix} 0 & 1 & 0 \\ 0 & 0 & 1 \\ 1/\sqrt{2} & 0 & 0 \\ 1/\sqrt{2}j & 0 & 0 \end{bmatrix},$$

$$\frac{1}{\sqrt{3}}\begin{bmatrix} 1/\sqrt{2} & 0 & 0 \\ 0 & 1 & 0 \\ -1/\sqrt{2}j & 0 & 0 \\ 0 & 0 & 1 \end{bmatrix}, \frac{1}{\sqrt{3}}\begin{bmatrix} 0 & 1 & 0 \\ 1/\sqrt{2} & 0 & 0 \\ 0 & 0 & 1 \\ -1/\sqrt{2}j & 0 & 0 \end{bmatrix},$$

$$\frac{1}{\sqrt{3}}\begin{bmatrix} 1/\sqrt{2} & 0 & 0 \\ -1/\sqrt{2}j & 0 & 0 \\ 0 & 1 & 0 \\ 0 & 0 & 1 \end{bmatrix}, \frac{1}{\sqrt{3}}\begin{bmatrix} 0 & 1 & 0 \\ 0 & 0 & 1 \\ 1/\sqrt{2} & 0 & 0 \\ -1/\sqrt{2}j & 0 & 0 \end{bmatrix}, \quad (2)$$

For the codebook structures as shown in expression (2), the transmit power of the first transmit antenna and the transmit power of the third transmit antenna are only half of that of the second transmit antenna and the fourth transmit antenna, and if the transmit power of the transmit antennas are restricted, the power amplification of the four transmit antennas is unable to be completely used for full power transfer, that is, the power amplification of all antennas are imbalanced.

A third codebook structure is as shown in expression (3).

$$\begin{bmatrix} 1 & 1 & 0 \\ -1 & 1 & 0 \\ 1 & 0 & 1 \\ j & 0 & -j \end{bmatrix}\Lambda, \begin{bmatrix} 1 & 1 & 0 \\ -1 & 1 & 0 \\ -1 & 0 & 1 \\ -j & 0 & -j \end{bmatrix}\Lambda, \begin{bmatrix} 1 & 1 & 0 \\ -1 & 1 & 0 \\ j & 0 & 1 \\ 1 & 0 & j \end{bmatrix}\Lambda, \begin{bmatrix} 1 & 1 & 0 \\ -1 & 1 & 0 \\ -j & 0 & 1 \\ -1 & 0 & j \end{bmatrix}\Lambda, \quad (3)$$

$$\begin{bmatrix} 1 & 1 & 0 \\ j & -j & 0 \\ 1 & 0 & 1 \\ -1 & 0 & 1 \end{bmatrix}\Lambda, \begin{bmatrix} 1 & 1 & 0 \\ j & -j & 0 \\ 1 & 0 & 1 \\ -1 & 0 & 1 \end{bmatrix}\Lambda, \begin{bmatrix} 1 & 1 & 0 \\ j & -j & 0 \\ 1 & 0 & 1 \\ -1 & 0 & 1 \end{bmatrix}\Lambda,$$

$$\Lambda, \begin{bmatrix} 1 & 1 & 0 \\ j & -j & 0 \\ 1 & 0 & 1 \\ -1 & 0 & 1 \end{bmatrix}\Lambda, \begin{bmatrix} 1 & 1 & 0 \\ j & -j & 0 \\ 1 & 0 & 1 \\ -1 & 0 & 1 \end{bmatrix}\Lambda, \begin{bmatrix} 1 & 1 & 0 \\ j & -j & 0 \\ 1 & 0 & 1 \\ -1 & 0 & 1 \end{bmatrix}\Lambda,$$

$$\Lambda, \begin{bmatrix} 1 & 1 & 0 \\ j & -j & 0 \\ 1 & 0 & 1 \\ -1 & 0 & 1 \end{bmatrix}\Lambda, \begin{bmatrix} 1 & 1 & 0 \\ j & -j & 0 \\ 1 & 0 & 1 \\ -1 & 0 & 1 \end{bmatrix}\Lambda, \begin{bmatrix} 1 & 1 & 0 \\ j & -j & 0 \\ 1 & 0 & 1 \\ -1 & 0 & 1 \end{bmatrix}\Lambda,$$

$$\Lambda, \begin{bmatrix} 1 & 1 & 0 \\ j & -j & 0 \\ 1 & 0 & 1 \\ -1 & 0 & 1 \end{bmatrix}\Lambda, \begin{bmatrix} 1 & 1 & 0 \\ j & -j & 0 \\ 1 & 0 & 1 \\ -1 & 0 & 1 \end{bmatrix}\Lambda, \begin{bmatrix} 1 & 1 & 0 \\ j & -j & 0 \\ 1 & 0 & 1 \\ -1 & 0 & 1 \end{bmatrix}\Lambda$$

$\Lambda$ is a normalized matrix.

For the codebook structure as shown in expression (3), as data of the carrier overlap exists among all antennas, the CM characteristics of the SC-FDMA are unable to be preserved.

Different from the precoding data to be transmitted by adopting an existing codebook structure, the codebook structure adopted in this embodiment can include two parts and K codewords in total. M codewords belong to the first codebook with imbalanced power between layers, and other (K-M) codewords belong to the second codebook with balanced power between layers.

In another embodiment of the precoding method according to the present invention, the first codebook includes at least one codeword of $$\frac{1}{2}\begin{bmatrix} 1 & 0 & 0 \\ 0 & 1 & 0 \\ x & 0 & 0 \\ 0 & 0 & 1 \end{bmatrix}, \frac{1}{2}\begin{bmatrix} 0 & 1 & 0 \\ 1 & 0 & 0 \\ 0 & 0 & 1 \\ x & 0 & 0 \end{bmatrix}, \frac{1}{2}\begin{bmatrix} 1 & 0 & 0 \\ x & 0 & 0 \\ 0 & 1 & 0 \\ 0 & 0 & 1 \end{bmatrix},$$

$$\frac{1}{2}\begin{bmatrix} 0 & 1 & 0 \\ 0 & 0 & 1 \\ 1 & 0 & 0 \\ x & 0 & 0 \end{bmatrix}, \frac{1}{2}\begin{bmatrix} 1 & 0 & 0 \\ 0 & 0 & 1 \\ 0 & 1 & 0 \\ x & 0 & 0 \end{bmatrix}, \text{and } \frac{1}{2}\begin{bmatrix} 0 & 1 & 0 \\ 1 & 0 & 0 \\ x & 0 & 0 \\ 0 & 0 & 1 \end{bmatrix},$$

in which $x \in \{+1, -1, +j, -j\}$.

It can be seen from the structure of the first codebook that the transmit power in the first layer is twice as much as that in the second layer and that in the third layer, that is, the power between layers in the first codebook is imbalanced.

The second codebook includes at least one codeword of $$\begin{bmatrix} 1 & 0 & 0 \\ 0 & 1 & 0 \\ x & 0 & 0 \\ 0 & 0 & 1 \end{bmatrix} H, \begin{bmatrix} 0 & 1 & 0 \\ 1 & 0 & 0 \\ 0 & 0 & 1 \\ x & 0 & 0 \end{bmatrix} H, \begin{bmatrix} 1 & 0 & 0 \\ x & 0 & 0 \\ 0 & 1 & 0 \\ 0 & 0 & 1 \end{bmatrix} H, \begin{bmatrix} 0 & 1 & 0 \\ 0 & 0 & 1 \\ 1 & 0 & 0 \\ x & 0 & 0 \end{bmatrix} H, \begin{bmatrix} 1 & 0 & 0 \\ 0 & 0 & 1 \\ 0 & 1 & 0 \\ x & 0 & 0 \end{bmatrix} H,$$

and $$\begin{bmatrix} 0 & 1 & 0 \\ 1 & 0 & 0 \\ x & 0 & 0 \\ 0 & 0 & 1 \end{bmatrix} H,$$

in which $$H = \begin{bmatrix} \frac{1}{\sqrt{6}} & 0 & 0 \\ 0 & \frac{1}{\sqrt{3}} & 0 \\ 0 & 0 & \frac{1}{\sqrt{3}} \end{bmatrix},$$

and $x \in \{+1, -1, +j, -j\}$.

It can be seen from the structure of the second codebook that the three layers have an equal transmit power, that is, the power of different layers in the second codebook is balanced.

In this embodiment, it is assumed that the rated transmit power of the antenna is 1, the rated total transmit power of the four antennas is 4, so the eNodeB can learn whether the total uplink power of the UE is greater than $$4 \times \frac{3}{4} = 3.$$

If the total uplink power of the UE is greater than 3, for the second codebook, as the power of different layers is balanced, the transmit power of each layer is greater than 1. For example, the eNodeB learns that the total uplink power of the UE is 4, so each layer of the second codebook has a transmit power of $$\frac{4}{3} \approx 1.33,$$

which exceeds the rated transmit power 1 of the each transmit antenna in each layer. For the first codebook, as the power of different layers is imbalanced, full power can be adopted in all three layers for data transmission, that is, the transmit power in the first layer is 2, and the transmit power in both the second layer and the third layer is 1. If the eNodeB learns that the total uplink power of the UE is smaller than or equal to $$4 \times \frac{3}{4} = 3,$$

as the transmit power of each antenna in the first codebook and the second codebook can be smaller than the rated transmit power 1, the eNodeB can select the codebook in the first codebook, and can also select the codebook in the second codebook.

Therefore, if the eNodeB learns that the total uplink power of the UE is greater than ¾ of the rated total transmit power of the antennas, the eNodeB may select a codeword from the first codebook, and if the eNodeB learns that the total uplink power is smaller than or equal to ¾ of the rated total transmit power of the antennas, the eNodeB may select a codeword from a codebook formed by the first codebook and the second codebook.

For the method in which the eNodeB selects a codeword from a codebook formed by a first codebook and a second codebook for precoding data to be transmitted by using the selected codeword, any method in the prior art can be adopted, the description of which is omitted.

In yet another embodiment of the precoding method according to the present invention, the first codebook and the second codebook have 16 codewords in total, in which the first codebook has 8 codewords. Therefore, in this embodiment, the codebook including the first codebook and the second codebook may be:

| Index 0 to 3 | $\frac{1}{2}\begin{bmatrix} 1 & 0 & 0 \\ 0 & 0 & 1 \\ 0 & 1 & 0 \\ 1 & 0 & 0 \end{bmatrix}$ | $\frac{1}{2}\begin{bmatrix} 1 & 0 & 0 \\ 0 & 0 & 1 \\ 0 & 1 & 0 \\ -1 & 0 & 0 \end{bmatrix}$ | $\frac{1}{2}\begin{bmatrix} 1 & 0 & 0 \\ 0 & 0 & 1 \\ 0 & 1 & 0 \\ j & 0 & 0 \end{bmatrix}$ | $\frac{1}{2}\begin{bmatrix} 1 & 0 & 0 \\ 0 & 0 & 1 \\ 0 & 1 & 0 \\ -j & 0 & 0 \end{bmatrix}$ |
|---|---|---|---|---|
| Index 4 to 7 | $\frac{1}{2}\begin{bmatrix} 0 & 1 & 0 \\ 1 & 0 & 0 \\ 1 & 0 & 0 \\ 0 & 0 & 1 \end{bmatrix}$ | $\frac{1}{2}\begin{bmatrix} 0 & 1 & 0 \\ 1 & 0 & 0 \\ -1 & 0 & 0 \\ 0 & 0 & 1 \end{bmatrix}$ | $\frac{1}{2}\begin{bmatrix} 0 & 1 & 0 \\ 1 & 0 & 0 \\ j & 0 & 0 \\ 0 & 0 & 1 \end{bmatrix}$ | $\frac{1}{2}\begin{bmatrix} 0 & 1 & 0 \\ 1 & 0 & 0 \\ -j & 0 & 0 \\ 0 & 0 & 1 \end{bmatrix}$ |
| Index 8 to 11 | $\begin{bmatrix} 1 & 0 & 0 \\ 0 & 1 & 0 \\ 1 & 0 & 0 \\ 0 & 0 & 1 \end{bmatrix} \Lambda$ | $\begin{bmatrix} 1 & 0 & 0 \\ 0 & 1 & 0 \\ -1 & 0 & 0 \\ 0 & 0 & 1 \end{bmatrix} \Lambda$ | $\begin{bmatrix} 0 & 1 & 0 \\ 1 & 0 & 0 \\ 0 & 0 & 1 \\ 1 & 0 & 0 \end{bmatrix} \Lambda$ | $\begin{bmatrix} 0 & 1 & 0 \\ 1 & 0 & 0 \\ 0 & 0 & 1 \\ -1 & 0 & 0 \end{bmatrix} \Lambda$ |
| Index 12 to 15 | $\begin{bmatrix} 1 & 0 & 0 \\ 1 & 0 & 0 \\ 0 & 1 & 0 \\ 0 & 0 & 1 \end{bmatrix} \Lambda$ | $\begin{bmatrix} 1 & 0 & 0 \\ -1 & 0 & 0 \\ 0 & 1 & 0 \\ 0 & 0 & 1 \end{bmatrix} \Lambda$ | $\begin{bmatrix} 0 & 1 & 0 \\ 0 & 0 & 1 \\ 1 & 0 & 0 \\ 1 & 0 & 0 \end{bmatrix} \Lambda$ | $\begin{bmatrix} 0 & 1 & 0 \\ 0 & 0 & 1 \\ 1 & 0 & 0 \\ -1 & 0 & 0 \end{bmatrix} \Lambda$ |

In yet another embodiment of the precoding method according to the present invention, on the basis of the embodiment as shown in FIG. 1, the precoding method further includes the following steps. A first codebook and a second codebook are selected from the codebook so as to maximize a minimal chordal distance of the codewords of the first codebook and the second codebook, and an antenna performance corresponding to a codeword in the first codebook is different from an antenna performance corresponding to a codeword in the second codebook, so that if the total uplink power is greater than ¾ of a rated total transmit power of antennas, a codeword is selected from a codebook formed by the first codebook and the second codebook. The step and Step 101 may have no specific order.

Specifically, the eNodeB can use many codewords for precoding, and the large amount of codewords form a codebook. However, in this embodiment, a first codebook and a second codebook are selected from the codebook by using two rules. It is assumed that the selected first codebook and the selected second codebook have K codewords in total, so one principle of selecting the K codewords is so as to maximize a minimal chordal distance of the K selected codewords. A chordal distance of any two codewords $u_i$ and $u_j$ is defined as:

$$d(u_i, u_j) = \frac{1}{\sqrt{2}} \|u_i u_i^H - u_j u_j^H\|_F, \text{ in which } \|u_i\|_F = \|u_j\|_F = 1.$$

Thus, the equation can be adopted to calculate a chordal distance of any two codewords, and a codeword is selected according to the calculated chordal distance, so as to construct the first codebook and the second codebook respectively.

A principle of selecting the K codewords is that if the influences of power allocation matrix are not considered, the corresponding codewords in the first codebook and the second codebook are same. In the process of selecting the codewords in the whole codebook, this situation of same codewords needs to be avoided.

For example, if $$\frac{1}{2}\begin{bmatrix} 1 & 0 & 0 \\ 0 & 1 & 0 \\ 1 & 0 & 0 \\ 0 & 0 & 1 \end{bmatrix}$$

is selected as a codeword in the first codebook, $$\begin{bmatrix} 1 & 0 & 0 \\ 0 & 1 & 0 \\ 1 & 0 & 0 \\ 0 & 0 & 1 \end{bmatrix} \times \begin{bmatrix} \frac{1}{\sqrt{6}} & 0 & 0 \\ 0 & \frac{1}{\sqrt{3}} & 0 \\ 0 & 0 & \frac{1}{\sqrt{3}} \end{bmatrix}$$

is not allowed to be a codeword in the second codebook, and vice versa, that is, the antenna performance corresponding to the codeword in the first codebook is different from the antenna performance corresponding to the codeword in the second codebook.

In the embodiments of the precoding method according to the present invention, the BS can select a codeword from a corresponding codebook for precoding data to be transmitted according to a relationship between the total uplink power reported by the UE and the maximal rated total power of the antenna of the BS. As in the method in this embodiment, the codebook structure adopts the first codebook with imbalanced power between layers and the second codebook with balanced structures between layers, if a codeword is selected from the second codebook for precoding, loss of the antenna performance at a high signal-to-noise ratio can be reduced, and if a codeword is selected from the first codebook for precoding, the loss of the power amplification of the antenna can be reduced if the transmit power of the antennas is restricted.

Figure 2:
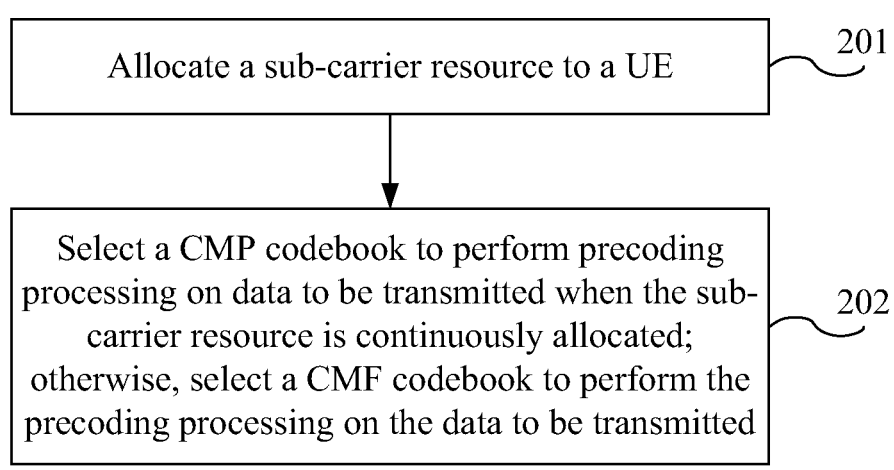
FIG. 2 is a flow chart of another embodiment of the precoding method according to the present invention.

FIG. 2 is a flow chart of another embodiment of a precoding method according to the present invention. As shown in FIG. 2, the method in this embodiment includes the following steps.

In Step 201, a sub-carrier resource is allocated to a UE.

For example, an eNodeB can allocate a sub-carrier resource to the UE, in which the sub-carrier resource is used for data transmission between the UE and the eNodeB. The eNodeB may allocate a continuous sub-carrier resource to the UE and may also allocate discontinuous sub-carrier resource to the UE.

In Step 202, if the sub-carrier resource is continuously allocated, a CMP codebook is selected for precoding data to be transmitted; otherwise, a CMF codebook is selected for precoding data to be transmitted.

The eNodeB can correspondingly select different codebooks for precoding data to be transmitted according to whether the sub-carrier resource allocated by the UE is continuously allocated or discontinuously allocated. If the eNodeB learns that the sub-carrier resource allocated to the UE is continuously allocated, transmitted data of the sub-carriers do not need overlap, so if this resource allocation mode is adopted for data transmission, the eNodeB can select a CMP codebook. If the eNodeB learns that the sub-carrier resource allocated to the UE is discontinuously allocated, transmitted data of the sub-carriers do need overlap, so if this resource allocation mode is adopted for data transmission, the eNodeB can select a CMF codebook. The CMF codebook refers to a codebook that incompletely preserves CM characteristics. For any codeword in a CMP codebook, each row only has one non-zero element. For any codeword in a CMF codebook, in some rows, more than one non-zero elements exist, but in the rows, not all elements are non-zero. For example, one row only has two non-zero elements, and others are still zero. Therefore, compared with the CMP codebook, some CMs are added in the CMF codebook. However, not many CMs are added. Therefore, compared with a codebook in which the CM characteristic design is completely not considered, the CMF codebook has better CM characteristics.

In a precoding method according to an embodiment of the present invention, the CMP codebook includes at least one codeword of $$\frac{1}{2}\begin{bmatrix} 0 & 1 & 0 \\ 1 & 0 & 0 \\ 0 & 0 & 1 \\ x & 0 & 0 \end{bmatrix}, \frac{1}{2}\begin{bmatrix} 1 & 0 & 0 \\ 0 & 1 & 0 \\ x & 0 & 0 \\ 0 & 0 & 1 \end{bmatrix}, \frac{1}{2}\begin{bmatrix} 1 & 0 & 0 \\ x & 0 & 0 \\ 0 & 1 & 0 \\ 0 & 0 & 1 \end{bmatrix}, \text{ and } \frac{1}{2}\begin{bmatrix} 0 & 1 & 0 \\ 0 & 0 & 1 \\ 1 & 0 & 0 \\ x & 0 & 0 \end{bmatrix},$$

in which $x \in \{+1, -1, +j, -j\}$; or includes at least one codeword of $$\frac{1}{\sqrt{3}}\begin{bmatrix} \frac{1}{\sqrt{2}} & 0 & 0 \\ 0 & 1 & 0 \\ \frac{1}{\sqrt{2}} & 0 & 0 \\ 0 & 0 & 1 \end{bmatrix}, \frac{1}{\sqrt{3}}\begin{bmatrix} 0 & 1 & 0 \\ \frac{1}{\sqrt{2}} & 0 & 0 \\ 0 & 0 & 1 \\ \frac{1}{\sqrt{2}} & 0 & 0 \end{bmatrix}, \frac{1}{\sqrt{3}}\begin{bmatrix} \frac{1}{\sqrt{2}} & 0 & 0 \\ \frac{1}{\sqrt{2}} & 0 & 0 \\ 0 & 1 & 0 \\ 0 & 0 & 1 \end{bmatrix},$$

$$\frac{1}{\sqrt{3}}\begin{bmatrix} 0 & 1 & 0 \\ 0 & 0 & 1 \\ \frac{1}{\sqrt{2}} & 0 & 0 \\ \frac{1}{\sqrt{2}} & 0 & 0 \end{bmatrix}, \frac{1}{\sqrt{3}}\begin{bmatrix} \frac{1}{\sqrt{2}} & 0 & 0 \\ 0 & 1 & 0 \\ \frac{-1}{\sqrt{2}} & 0 & 0 \\ 0 & 0 & 1 \end{bmatrix}, \frac{1}{\sqrt{3}}\begin{bmatrix} 0 & 1 & 0 \\ \frac{1}{\sqrt{2}} & 0 & 0 \\ 0 & 0 & 1 \\ \frac{-1}{\sqrt{2}} & 0 & 0 \end{bmatrix},$$

$$\frac{1}{\sqrt{3}}\begin{bmatrix} \frac{1}{\sqrt{2}} & 0 & 0 \\ \frac{-1}{\sqrt{2}} & 0 & 0 \\ 0 & 1 & 0 \\ 0 & 0 & 1 \end{bmatrix}, \frac{1}{\sqrt{3}}\begin{bmatrix} 0 & 1 & 0 \\ 0 & 0 & 1 \\ \frac{1}{\sqrt{2}} & 0 & 0 \\ \frac{-1}{\sqrt{2}} & 0 & 0 \end{bmatrix}, \frac{1}{\sqrt{3}}\begin{bmatrix} \frac{1}{\sqrt{2}} & 0 & 0 \\ 0 & 1 & 0 \\ \frac{1}{\sqrt{2}j} & 0 & 0 \\ 0 & 0 & 1 \end{bmatrix},$$

$$\frac{1}{\sqrt{3}}\begin{bmatrix} 0 & 1 & 0 \\ \frac{1}{\sqrt{2}} & 0 & 0 \\ 0 & 0 & 1 \\ \frac{1}{\sqrt{2}j} & 0 & 0 \end{bmatrix}, \frac{1}{\sqrt{3}}\begin{bmatrix} \frac{1}{\sqrt{2}} & 0 & 0 \\ \frac{1}{\sqrt{2}j} & 0 & 0 \\ 0 & 1 & 0 \\ 0 & 0 & 1 \end{bmatrix},$$

$$\frac{1}{\sqrt{3}}\begin{bmatrix} 0 & 1 & 0 \\ 0 & 0 & 1 \\ \frac{1}{\sqrt{2}} & 0 & 0 \\ \frac{1}{\sqrt{2}} & 0 & 0 \end{bmatrix}, \frac{1}{\sqrt{3}}\begin{bmatrix} \frac{1}{\sqrt{2}} & 0 & 0 \\ \frac{-1}{\sqrt{2}j} & 0 & 0 \\ 0 & 1 & 0 \\ 0 & 0 & 1 \end{bmatrix}, \frac{1}{\sqrt{3}}\begin{bmatrix} 0 & 1 & 0 \\ \frac{1}{\sqrt{2}} & 0 & 0 \\ 0 & 0 & 1 \\ \frac{-1}{\sqrt{2}j} & 0 & 0 \end{bmatrix},$$

$$\frac{1}{\sqrt{3}}\begin{bmatrix} \frac{1}{\sqrt{2}} & 0 & 0 \\ \frac{-1}{\sqrt{2}j} & 0 & 0 \\ 0 & 1 & 0 \\ 0 & 0 & 1 \end{bmatrix}, \text{ and } \frac{1}{\sqrt{3}}\begin{bmatrix} 0 & 1 & 0 \\ 0 & 0 & 1 \\ \frac{1}{\sqrt{2}} & 0 & 0 \\ \frac{-1}{\sqrt{2}j} & 0 & 0 \end{bmatrix}.$$

The CMF codebook includes at least one codeword of $$\begin{bmatrix} 1 & 1 & 0 \\ -1 & 1 & 0 \\ 1 & 0 & 1 \\ j & 0 & -j \end{bmatrix}\Lambda, \begin{bmatrix} 1 & 1 & 0 \\ -1 & 1 & 0 \\ -1 & 0 & 1 \\ -j & 0 & -j \end{bmatrix}\Lambda, \begin{bmatrix} 1 & 1 & 0 \\ -1 & 1 & 0 \\ j & 0 & 1 \\ 1 & 0 & j \end{bmatrix}\Lambda,$$

$$\begin{bmatrix} 1 & 1 & 0 \\ -1 & 1 & 0 \\ -j & 0 & 1 \\ -1 & 0 & j \end{bmatrix}\Lambda, \begin{bmatrix} 1 & 1 & 0 \\ j & -j & 0 \\ 1 & 0 & 1 \\ -1 & 0 & 1 \end{bmatrix}\Lambda, \begin{bmatrix} 1 & 1 & 0 \\ j & -j & 0 \\ 1 & 0 & 1 \\ -1 & 0 & 1 \end{bmatrix}\Lambda,$$

$$\begin{bmatrix} 1 & 1 & 0 \\ j & -j & 0 \\ 1 & 0 & 1 \\ -1 & 0 & 1 \end{bmatrix}\Lambda, \begin{bmatrix} 1 & 1 & 0 \\ j & -j & 0 \\ 1 & 0 & 1 \\ -1 & 0 & 1 \end{bmatrix}\Lambda, \begin{bmatrix} 1 & 1 & 0 \\ j & -j & 0 \\ 1 & 0 & 1 \\ -1 & 0 & 1 \end{bmatrix}\Lambda,$$

$$\begin{bmatrix} 1 & 1 & 0 \\ j & -j & 0 \\ 1 & 0 & 1 \\ -1 & 0 & 1 \end{bmatrix}\Lambda, \begin{bmatrix} 1 & 1 & 0 \\ j & -j & 0 \\ 1 & 0 & 1 \\ -1 & 0 & 1 \end{bmatrix}\Lambda, \begin{bmatrix} 1 & 1 & 0 \\ j & -j & 0 \\ 1 & 0 & 1 \\ -1 & 0 & 1 \end{bmatrix}\Lambda,$$

$$\begin{bmatrix} 1 & 1 & 0 \\ j & -j & 0 \\ 1 & 0 & 1 \\ -1 & 0 & 1 \end{bmatrix}\Lambda, \begin{bmatrix} 1 & 1 & 0 \\ j & -j & 0 \\ 1 & 0 & 1 \\ -1 & 0 & 1 \end{bmatrix}\Lambda, \begin{bmatrix} 1 & 1 & 0 \\ j & -j & 0 \\ 1 & 0 & 1 \\ -1 & 0 & 1 \end{bmatrix}\Lambda,$$

and $$\begin{bmatrix} 1 & 1 & 0 \\ j & -j & 0 \\ 1 & 0 & 1 \\ -1 & 0 & 1 \end{bmatrix}\Lambda,$$

in which $\Lambda$ is a normalized matrix.

In the embodiment of the precoding method according to the present invention, the BS selects a codeword in different codebooks respectively for precoding data to be transmitted according to different types of sub-carrier resources allocated by the UE, such that the CM characteristics are guaranteed by selecting the codeword in the CMP codebook if the sub-carrier resource is continuously allocated.

An embodiment of the present invention provides a codebook, which includes at least one codeword of $$\frac{1}{2}\begin{bmatrix} 0 & 1 & 0 \\ 1 & 0 & 0 \\ 0 & 0 & 1 \\ 1 & 0 & 0 \end{bmatrix}, \frac{1}{2}\begin{bmatrix} 0 & 1 & 0 \\ 1 & 0 & 0 \\ 0 & 0 & 1 \\ -1 & 0 & 0 \end{bmatrix}, \frac{1}{2}\begin{bmatrix} 1 & 0 & 0 \\ 0 & 1 & 0 \\ 1 & 0 & 0 \\ 0 & 0 & 1 \end{bmatrix}, \frac{1}{2}\begin{bmatrix} 1 & 0 & 0 \\ 0 & 1 & 0 \\ -1 & 0 & 0 \\ 0 & 0 & 1 \end{bmatrix},$$

$$\frac{1}{2}\begin{bmatrix} 1 & 0 & 0 \\ 1 & 0 & 0 \\ 0 & 1 & 0 \\ 0 & 0 & 1 \end{bmatrix}, \frac{1}{2}\begin{bmatrix} 1 & 0 & 0 \\ -1 & 0 & 0 \\ 0 & 1 & 0 \\ 0 & 0 & 1 \end{bmatrix}, \frac{1}{2}\begin{bmatrix} 0 & 1 & 0 \\ 0 & 0 & 1 \\ 1 & 0 & 0 \\ 1 & 0 & 0 \end{bmatrix}, \frac{1}{2}\begin{bmatrix} 0 & 1 & 0 \\ 0 & 0 & 1 \\ 1 & 0 & 0 \\ -1 & 0 & 0 \end{bmatrix},$$

$$\frac{1}{2}\begin{bmatrix} 1 & 0 & 0 \\ 0 & 0 & 1 \\ 0 & 1 & 0 \\ 1 & 0 & 0 \end{bmatrix}, \frac{1}{2}\begin{bmatrix} 1 & 0 & 0 \\ 0 & 0 & 1 \\ 0 & 1 & 0 \\ -1 & 0 & 0 \end{bmatrix}, \frac{1}{2}\begin{bmatrix} 0 & 1 & 0 \\ 1 & 0 & 0 \\ 1 & 0 & 0 \\ 0 & 0 & 1 \end{bmatrix}, \text{ and } \frac{1}{2}\begin{bmatrix} 0 & 1 & 0 \\ 1 & 0 & 0 \\ -1 & 0 & 0 \\ 0 & 0 & 1 \end{bmatrix}.$$

In this embodiment the codebook is a BPSK CMP codebook, in the codebook in this embodiment, all codewords are BPSK characters, and the number is at most 12, so compared with the codebook as shown in expression (1), for the codebook in this embodiment, the complexity of the precoding using the codebook is relatively reduced.

Furthermore, in this embodiment, the codebook further includes at least one codeword of $$\frac{1}{2}\begin{bmatrix} 0 & 1 & 0 \\ 1 & 0 & 0 \\ 0 & 0 & 1 \\ j & 0 & 0 \end{bmatrix}, \frac{1}{2}\begin{bmatrix} 0 & 1 & 0 \\ 1 & 0 & 0 \\ 0 & 0 & 1 \\ -j & 0 & 0 \end{bmatrix}, \frac{1}{2}\begin{bmatrix} 1 & 0 & 0 \\ 0 & 1 & 0 \\ j & 0 & 0 \\ 0 & 0 & 1 \end{bmatrix}, \text{and } \frac{1}{2}\begin{bmatrix} 1 & 0 & 0 \\ 0 & 1 & 0 \\ -j & 0 & 0 \\ 0 & 0 & 1 \end{bmatrix}.$$

Therefore, the codebook in this embodiment includes at least one codeword of the following codebook structures:

$$\frac{1}{2}\begin{bmatrix} 0 & 1 & 0 \\ 1 & 0 & 0 \\ 0 & 0 & 1 \\ 1 & 0 & 0 \end{bmatrix}, \frac{1}{2}\begin{bmatrix} 0 & 1 & 0 \\ 1 & 0 & 0 \\ 0 & 0 & 1 \\ -1 & 0 & 0 \end{bmatrix}, \frac{1}{2}\begin{bmatrix} 0 & 1 & 0 \\ 1 & 0 & 0 \\ 0 & 0 & 1 \\ j & 0 & 0 \end{bmatrix}, \frac{1}{2}\begin{bmatrix} 0 & 1 & 0 \\ 1 & 0 & 0 \\ 0 & 0 & 1 \\ -j & 0 & 0 \end{bmatrix},$$

$$\frac{1}{2}\begin{bmatrix} 1 & 0 & 0 \\ 0 & 1 & 0 \\ 1 & 0 & 0 \\ 0 & 0 & 1 \end{bmatrix}, \frac{1}{2}\begin{bmatrix} 1 & 0 & 0 \\ 0 & 1 & 0 \\ -1 & 0 & 0 \\ 0 & 0 & 1 \end{bmatrix}, \frac{1}{2}\begin{bmatrix} 1 & 0 & 0 \\ 0 & 1 & 0 \\ j & 0 & 0 \\ 0 & 0 & 1 \end{bmatrix}, \frac{1}{2}\begin{bmatrix} 1 & 0 & 0 \\ 0 & 1 & 0 \\ -j & 0 & 0 \\ 0 & 0 & 1 \end{bmatrix},$$

$$\frac{1}{2}\begin{bmatrix} 1 & 0 & 0 \\ 1 & 0 & 0 \\ 0 & 1 & 0 \\ 0 & 0 & 1 \end{bmatrix}, \frac{1}{2}\begin{bmatrix} 1 & 0 & 0 \\ -1 & 0 & 0 \\ 0 & 1 & 0 \\ 0 & 0 & 1 \end{bmatrix}, \frac{1}{2}\begin{bmatrix} 0 & 1 & 0 \\ 0 & 0 & 1 \\ 1 & 0 & 0 \\ 1 & 0 & 0 \end{bmatrix}, \frac{1}{2}\begin{bmatrix} 0 & 1 & 0 \\ 0 & 0 & 1 \\ 1 & 0 & 0 \\ -1 & 0 & 0 \end{bmatrix},$$

$$\frac{1}{2}\begin{bmatrix} 1 & 0 & 0 \\ 0 & 0 & 1 \\ 0 & 1 & 0 \\ 1 & 0 & 0 \end{bmatrix}, \frac{1}{2}\begin{bmatrix} 1 & 0 & 0 \\ 0 & 0 & 1 \\ 0 & 1 & 0 \\ -1 & 0 & 0 \end{bmatrix}, \frac{1}{2}\begin{bmatrix} 0 & 1 & 0 \\ 1 & 0 & 0 \\ 1 & 0 & 0 \\ 0 & 0 & 1 \end{bmatrix}, \text{and } \frac{1}{2}\begin{bmatrix} 0 & 1 & 0 \\ 1 & 0 & 0 \\ -1 & 0 & 0 \\ 0 & 0 & 1 \end{bmatrix}.$$

Figure 3:
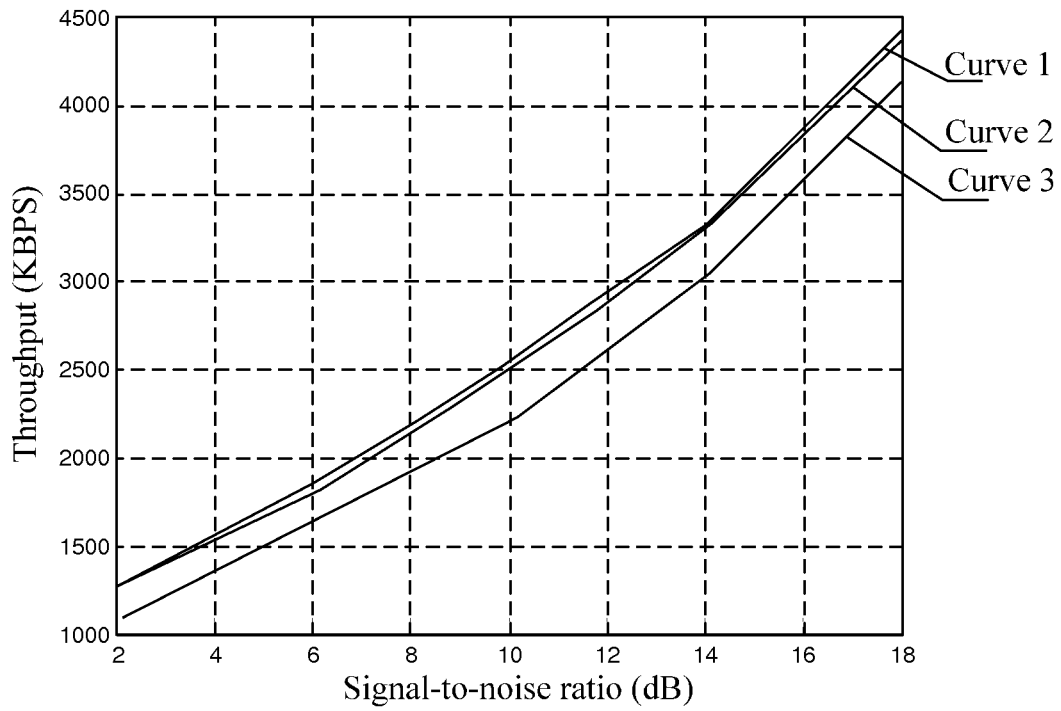
FIG. 3 is a comparison diagram between simulation results of a codebook of the present invention and a codebook as shown in expression (1)

Compared with the codebook as shown in expression (1), the codebook provided in this embodiment has a greater average code distance, in the codebook only 4 codewords are a QPSK character set, and the rest 12 codewords are a BPSK character set, so compared with the codebook as shown in expression (1), for the codebook in this embodiment, the complexity of precoding using the codebook is reduced to a certain degree. FIG. 3 is a comparison diagram between simulation results of a codebook of the present invention and a codebook as shown in expression (1). As shown in FIG. 3, through the link simulation, in a case of the same signal-to-noise ratio, the codebook in this embodiment (that is, the codebook as shown by curve 1 in FIG. 3) has a certain gain in terms of throughput compared with the codebook as shown in expression (1) (that is, the codebook as shown by curve 2 in FIG. 3) and the codebook as shown by curve 3 in FIG. 3, so as to transfer more data.

An embodiment of the present invention further provides another codebook, which includes at least one codeword of $$\frac{1}{\sqrt{5}}\begin{bmatrix} 0.5 & 1 & 0 \\ -0.5 & 1 & 0 \\ 0.5 & 0 & 1 \\ 0.5j & 0 & -j \end{bmatrix}, \frac{1}{\sqrt{5}}\begin{bmatrix} 0.5 & 1 & 0 \\ 0.5j & 0 & 1 \\ -0.5j & j & 0 \\ -0.5j & 0 & 1 \end{bmatrix}, \frac{1}{\sqrt{5}}\begin{bmatrix} 0.5 & 1 & 0 \\ -0.5 & 1 & 0 \\ 0.5j & 0 & 1 \\ 0.5 & 0 & j \end{bmatrix},$$

$$\frac{1}{\sqrt{5}}\begin{bmatrix} 0.5 & 1 & 0 \\ 0.5j & 0 & 1 \\ 0.5 & 0 & j \\ -0.5 & 1 & 0 \end{bmatrix}, \frac{1}{\sqrt{5}}\begin{bmatrix} 0.5 & 1 & 0 \\ -0.5j & 0 & 1 \\ -0.5 & 1 & 0 \\ -0.5 & 0 & j \end{bmatrix}, \frac{1}{\sqrt{5}}\begin{bmatrix} 0.5 & 1 & 0 \\ 0.5j & -j & 0 \\ -0.5 & 0 & 1 \\ 0.5 & 0 & 1 \end{bmatrix},$$

$$\frac{1}{\sqrt{5}}\begin{bmatrix} 0.5 & 1 & 0 \\ 0.5j & -j & 0 \\ 0.5j & 0 & 1 \\ 0.5j & 0 & -1 \end{bmatrix}, \frac{1}{\sqrt{5}}\begin{bmatrix} 0.5 & 1 & 0 \\ -0.5 & 0 & 1 \\ -0.5j & 0 & -j \\ -0.5 & 1 & 0 \end{bmatrix},$$

$$\frac{1}{\sqrt{5}}\begin{bmatrix} 0.5 & 1 & 0 \\ 0.5 & -1 & 0 \\ 0.5j & 0 & 1 \\ -0.5 & 0 & -j \end{bmatrix}, \frac{1}{\sqrt{5}}\begin{bmatrix} 0.5 & 1 & 0 \\ -0.5 & 0 & 1 \\ -0.5 & 0 & -1 \\ -0.5j & j & 0 \end{bmatrix}, \frac{1}{\sqrt{5}}\begin{bmatrix} 0.5 & 1 & 0 \\ 0.5 & 0 & 1 \\ 0.5j & -j & 0 \\ -0.5 & 0 & 1 \end{bmatrix},$$

$$\frac{1}{\sqrt{5}}\begin{bmatrix} 0.5 & 1 & 0 \\ -0.5j & 0 & 1 \\ -0.5j & 0 & -1 \\ 0.5j & -j & 0 \end{bmatrix}, \frac{1}{\sqrt{5}}\begin{bmatrix} 0.5 & 1 & 0 \\ 0.5 & 0 & 1 \\ 0.5 & -1 & 0 \\ -0.5j & 0 & j \end{bmatrix}, \frac{1}{\sqrt{5}}\begin{bmatrix} 0.5 & 1 & 0 \\ -0.5j & j & 0 \\ -0.5j & 0 & 1 \\ 0.5j & 0 & 1 \end{bmatrix},$$

$$\frac{1}{\sqrt{5}}\begin{bmatrix} 0.5 & 1 & 0 \\ -0.5 & 0 & 1 \\ 0.5 & 0 & 1 \\ 0.5j & -j & 0 \end{bmatrix}, \text{and } \frac{1}{\sqrt{5}}\begin{bmatrix} 0.5 & 1 & 0 \\ -0.5j & j & 0 \\ -0.5 & 0 & 1 \\ -0.5 & 0 & -1 \end{bmatrix}.$$

In the codebook in this embodiment, imbalanced power between layers is introduced, so a power of a column with all elements being non-zero is further reduced so as to reduce a CM value, and after adjustment, a power ratio among all layers is 2:2:1, that is, two strong layers and one weak layer. A power ratio among all layers in the CMF codebook with balanced power between layers as shown in expression (3) is 1:1:1, so compared with the CMF codebook with balanced power between layers as shown in expression (3), for the codebook in this embodiment the CM value can be decreased, and as indicated through experiments, the CM value is decreased by 0.2 dB.

Figure 4:
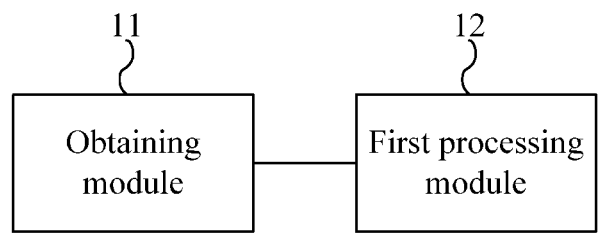
FIG. 4 is a schematic structural view of an embodiment of a BS according to the present invention.

FIG. 4 is a schematic structural view of an embodiment of a BS according to the present invention. As shown in FIG. 4, in this embodiment, the BS includes an obtaining module 11 and a first processing module 12. The obtaining module 11 is configured to obtain a total uplink power of a UE. The first processing module 12 is configured to select a codeword from a first codebook with imbalanced power between layers if the total uplink power is greater than ¾ of a rated total transmit power of antennas; otherwise, select a codeword from the first codebook and a second codebook with balanced power between layers, so as for precoding data to be transmitted according to the selected codeword.

The BS in this embodiment has the same principles as those in the embodiment of the precoding method as shown in FIG. 1, the description of which is omitted here.

Figure 5:
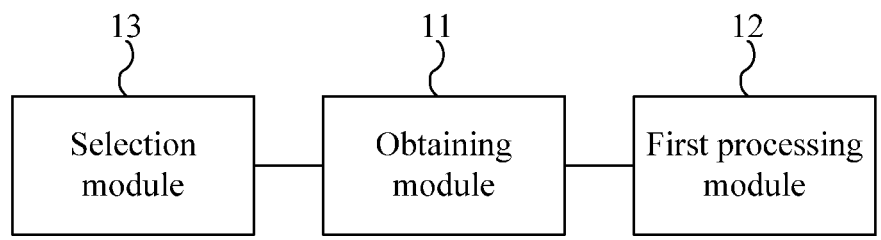
FIG. 5 is a schematic structural view of another embodiment of the BS according to the present invention.

FIG. 5 is a schematic structural view of another embodiment of the BS according to the present invention. As shown in FIG. 5, on the basis of the embodiment as shown in FIG. 4, in this embodiment the BS further includes a selection module 13. The selection module 13 is configured to select a first codebook and a second codebook from the codebook so as to maximize a minimal chordal distance of codewords of the first codebook and the second codebook, and an antenna performance corresponding to a codeword in the first codebook is different from an antenna performance corresponding to a codeword in the second codebook, such that if the total uplink power is greater than ¾ of a rated total transmit power of antennas, the first processing module 12 selects a codeword from a codebook formed by the first codebook and the second codebook. In this embodiment, the process that the selection module 13 selects the first codebook and the second codebook from the codebook can be performed before the process that the obtaining module 11 obtains the total uplink power of the UE.

Figure 6:
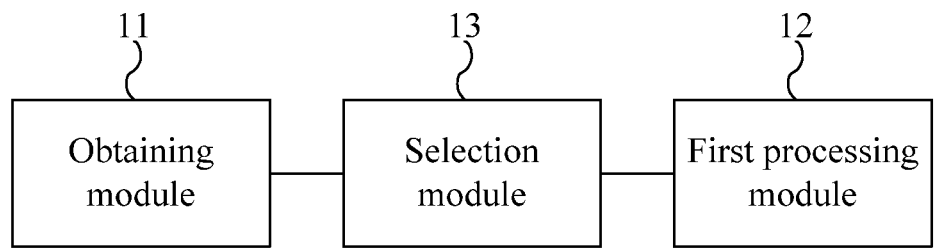
FIG. 6 is a schematic structural view of yet another embodiment of the BS according to the present invention.

FIG. 6 is a schematic structural view of yet another embodiment of the BS according to the present invention. As shown in FIG. 6, a difference between this embodiment and the embodiment of the BS as shown in FIG. 5 is that for the BS as shown in FIG. 6, a process that a selection module 13 of the BS selects the first codebook and the second codebook from the codebook can be performed after the process that the obtaining module 11 obtains the total uplink power of the UE.

The BS in the embodiment can select a codeword from a corresponding codebook according to a relationship between the total uplink power reported by the UE and the maximal rated total power of the antenna of the BS, so as for precoding data to be transmitted. As in the method in this embodiment, the codebook structure adopts the first codebook with imbalanced power between layers and the second codebook with balanced structures between layers, if a codeword is selected from the second codebook for precoding, the loss of the antenna performance at a high signal-to-noise ratio can be reduced, and if a codeword is selected from the first codebook for precoding, the loss of the power amplification of the antenna can be reduced if the transmit power of the antenna is restricted.

Figure 7:
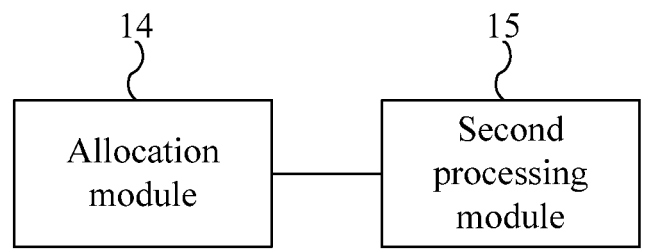
FIG. 7 is a schematic structural view of further another embodiment of the BS according to the present invention.

FIG. 7 is a schematic structural view of further another embodiment of the BS according to the present invention. As shown in FIG. 7, in this embodiment, the BS includes an allocation module 14 and a second processing module 15. The allocation module 14 is configured to allocate a sub-carrier resource to a UE. The second processing module 15 is configured to select a CMP codebook for precoding data to be transmitted if the sub-carrier resource is continuously allocated; otherwise, select a CMF codebook for precoding data to be transmitted.

In this embodiment, the BS can select a codeword in different codebooks respectively for precoding data to be transmitted according to different types of sub-carrier resources allocated by the UE, so the CM characteristic are guaranteed by selecting the codeword in the CMP codebook if the sub-carrier resource is continuously allocated.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications or equivalent replacements can be made to the technical solutions described in the present invention, as long as such modifications or replacements do not depart from the spirit and scope of the present invention.

Those of ordinary skill in the art should understand that all or a part of the steps of the method according to the embodiments may be implemented by a program instructing relevant hardware. The program may be stored in a computer readable storage medium such as a read-only memory (ROM), a magnetic disk or an optical disk.

The principle and implementation of the present invention are described herein through specific examples. The description about the embodiments of the present invention is merely provided for ease of understanding of the method and core ideas of the present invention. Persons of ordinary skill in the art can make variations to the present invention in terms of the specific implementations and application scopes according to the ideas of the present invention. Therefore, the specification shall not be construed as a limit to the present invention.

It should be noted that in the above device embodiments of the UE and BS, the units are divided according to logical functions, but the present invention is not limited to the division, as long as corresponding functions can be realized; and specific names of the units are merely provided for the purpose of distinguishing the units from one another, but not intended to limit the scope of the present invention.

It should be understood that the above descriptions are merely preferred embodiments of the present invention, but not intended to limit the scope of the present invention. Any modification or replacement made without departing from the technical scope of the present invention should fall within the scope of the present invention as defined in the claims.

What is claimed is:

1. In a communicating device used in the transmission of data, a method for selecting a codeword for precoding data, the method comprising:

accessing a codebook for precoding data;

selecting a codeword from the codebook, wherein the codebook consists of exactly twelve codewords, each codeword being based on a Binary Phase Shift Keying (BPSK) character set and the codewords being:

$$\frac{1}{2}\begin{bmatrix} 0 & 1 & 0 \\ 1 & 0 & 0 \\ 0 & 0 & 1 \\ 1 & 0 & 0 \end{bmatrix}, \frac{1}{2}\begin{bmatrix} 0 & 1 & 0 \\ 1 & 0 & 0 \\ 0 & 0 & 1 \\ -1 & 0 & 0 \end{bmatrix}, \frac{1}{2}\begin{bmatrix} 1 & 0 & 0 \\ 0 & 1 & 0 \\ 1 & 0 & 0 \\ 0 & 0 & 1 \end{bmatrix}, \frac{1}{2}\begin{bmatrix} 1 & 0 & 0 \\ 0 & 1 & 0 \\ -1 & 0 & 0 \\ 0 & 0 & 1 \end{bmatrix},$$

$$\frac{1}{2}\begin{bmatrix} 1 & 0 & 0 \\ 1 & 0 & 0 \\ 0 & 1 & 0 \\ 0 & 0 & 1 \end{bmatrix}, \frac{1}{2}\begin{bmatrix} 1 & 0 & 0 \\ -1 & 0 & 0 \\ 0 & 1 & 0 \\ 0 & 0 & 1 \end{bmatrix}, \frac{1}{2}\begin{bmatrix} 0 & 1 & 0 \\ 0 & 0 & 1 \\ 1 & 0 & 0 \\ 1 & 0 & 0 \end{bmatrix}, \frac{1}{2}\begin{bmatrix} 0 & 1 & 0 \\ 0 & 0 & 1 \\ 1 & 0 & 0 \\ -1 & 0 & 0 \end{bmatrix},$$

$$\frac{1}{2}\begin{bmatrix} 1 & 0 & 0 \\ 0 & 0 & 1 \\ 0 & 1 & 0 \\ 1 & 0 & 0 \end{bmatrix}, \frac{1}{2}\begin{bmatrix} 1 & 0 & 0 \\ 0 & 0 & 1 \\ 0 & 1 & 0 \\ -1 & 0 & 0 \end{bmatrix}, \frac{1}{2}\begin{bmatrix} 0 & 1 & 0 \\ 1 & 0 & 0 \\ 1 & 0 & 0 \\ 0 & 0 & 1 \end{bmatrix}, \text{and } \frac{1}{2}\begin{bmatrix} 0 & 1 & 0 \\ 1 & 0 & 0 \\ -1 & 0 & 0 \\ 0 & 0 & 1 \end{bmatrix};$$

and notifying a user equipment of the selected codeword for precoding the data.

2. The method for precoding of claim 1, wherein the data is uplink data.

3. The method for precoding of claim 1, wherein the method is applied in a Long Term Evolution-Advanced (LTE-A) system.

4. In a communication device for transmission of data, a computer program product comprising computer executable instructions stored on a non-transitory computer readable medium such that when executed by a computer program processor cause the communication device to access a codebook for precoding data;

select a codeword from the codebook, wherein the codebook consists of exactly twelve codewords, each codeword being based on a Binary Phase Shift Keying (BPSK) character set and the codewords being:

$$\frac{1}{2}\begin{bmatrix} 0 & 1 & 0 \\ 1 & 0 & 0 \\ 0 & 0 & 1 \\ 1 & 0 & 0 \end{bmatrix}, \frac{1}{2}\begin{bmatrix} 0 & 1 & 0 \\ 1 & 0 & 0 \\ 0 & 0 & 1 \\ -1 & 0 & 0 \end{bmatrix}, \frac{1}{2}\begin{bmatrix} 1 & 0 & 0 \\ 0 & 1 & 0 \\ 1 & 0 & 0 \\ 0 & 0 & 1 \end{bmatrix}, \frac{1}{2}\begin{bmatrix} 1 & 0 & 0 \\ 0 & 1 & 0 \\ -1 & 0 & 0 \\ 0 & 0 & 1 \end{bmatrix},$$

$$\frac{1}{2}\begin{bmatrix}1&0&0\\1&0&0\\0&1&0\\0&0&1\end{bmatrix}, \frac{1}{2}\begin{bmatrix}1&0&0\\-1&0&0\\0&1&0\\0&0&1\end{bmatrix}, \frac{1}{2}\begin{bmatrix}0&1&0\\0&0&1\\1&0&0\\1&0&0\end{bmatrix}, \frac{1}{2}\begin{bmatrix}0&1&0\\0&0&1\\1&0&0\\-1&0&0\end{bmatrix},$$

$$\frac{1}{2}\begin{bmatrix}1&0&0\\0&0&1\\0&1&0\\1&0&0\end{bmatrix}, \frac{1}{2}\begin{bmatrix}1&0&0\\0&0&1\\0&1&0\\-1&0&0\end{bmatrix}, \frac{1}{2}\begin{bmatrix}0&1&0\\1&0&0\\1&0&0\\0&0&1\end{bmatrix}, \text{and } \frac{1}{2}\begin{bmatrix}0&1&0\\1&0&0\\-1&0&0\\0&0&1\end{bmatrix};$$

and notify a user equipment of the selected codeword for precoding the data.

5. The computer program product of claim 4, wherein the base station is applied in a Long Term Evolution-Advanced (LTE-A) system.

6. The computer program product of claim 5, wherein the data is uplink data.

7. The computer program product of claim 4, wherein the communication device is a base station.

* * * * *